(12) United States Patent
Ellenrieder et al.

(10) Patent No.: US 8,118,931 B2
(45) Date of Patent: Feb. 21, 2012

(54) MIXTURE, IN PARTICULAR CONSTRUCTION MATERIAL MIXTURE CONTAINING FURNACE SLAG

(75) Inventors: Florian Ellenrieder, Augsburg (DE); Katja Voland, Berlin (DE); Uwe Gehrig, St. Georgen (DE); Samuele Beraldo, Roncade (IT); Joachim Riedmiller, Friedberg (DE)

(73) Assignee: Construction Research & Technology GmbH, Trostberg (DE)

( * ) Notice: Subject to any disclaimer, the term of this patent is extended or adjusted under 35 U.S.C. 154(b) by 0 days.

(21) Appl. No.: 12/993,552

(22) PCT Filed: May 14, 2009

(86) PCT No.: PCT/EP2009/055798
§ 371 (c)(1),
(2), (4) Date: Jan. 18, 2011

(87) PCT Pub. No.: WO2009/144141
PCT Pub. Date: Dec. 3, 2009

(65) Prior Publication Data
US 2011/0100262 A1    May 5, 2011

(30) Foreign Application Priority Data

May 30, 2008    (EP) .................................... 08104186

(51) Int. Cl.
*C04B 28/08*    (2006.01)
*C04B 18/00*    (2006.01)
*C04B 7/14*    (2006.01)

(52) U.S. Cl. .................. 106/790; 106/707; 106/789
(58) Field of Classification Search .................. 106/789, 106/790, 707
See application file for complete search history.

(56) References Cited

U.S. PATENT DOCUMENTS

| | | |
|---|---|---|
| 4,349,386 A | 9/1982 | Davidovits |
| 4,472,199 A | 9/1984 | Davidovits |
| 4,509,985 A | 4/1985 | Davidovits et al. |
| 5,073,198 A | 12/1991 | Kurz |
| 6,537,366 B1 | 3/2003 | Supplee |

FOREIGN PATENT DOCUMENTS

| | | | |
|---|---|---|---|
| CH | 629 246 | | 4/1982 |
| DE | 3 133 503 A1 | | 3/1983 |
| EP | 0 026 687 A2 | | 4/1981 |
| EP | 0 153 097 B1 | | 12/1989 |
| EP | 0 457 516 A1 | | 11/1991 |
| EP | 1 081 114 A1 | | 3/2001 |
| EP | 1 236 702 A1 | | 9/2002 |
| GB | 1 552 411 | | 9/1979 |
| JP | 52-132019 A | | 11/1977 |
| JP | 55-80747 A | * | 6/1980 |
| JP | 57-209872 A | | 12/1982 |
| JP | 59-195566 A | * | 11/1984 |
| JP | 2-302 346 | | 12/1990 |
| JP | 4-12043 | | 1/1992 |
| JP | 11-79822 | | 3/1999 |
| JP | 2000-073046 A | | 3/2000 |
| JP | 2003-049122 A | | 2/2003 |
| JP | 2003-71972 A | * | 3/2003 |
| JP | 2004-277188 A | * | 10/2004 |
| SU | 1708794 A1 | * | 1/1992 |
| WO | WO 82/00816 | | 3/1982 |

OTHER PUBLICATIONS

Derwent-Acc-No. 2009-B49286, abstract of Chinese Patent Specification No. CN 101323778A (Dec. 2008).*
Qian, Guangre, et al., "Characterization of mercury- and zinc-doped alkali-activated slag matrix Part II. Zinc", Cement and Concrete Research, vol. 33, 2003, pp. 1257-1262.
PCT/EP2009/052889—Written Opinion of the International Searching Authority, Aug. 31, 2009.
PCT/EP2009/052889—International Search Report, Aug. 31, 2009.

* cited by examiner

*Primary Examiner* — Anthony J Green
(74) *Attorney, Agent, or Firm* — Curatolo Sidoti Co., LPA; Joseph G. Curatolo; Vincent A. Cortese

(57) ABSTRACT

The present invention relates to building material mixtures which contain slag sand and zinc salts which have from 0 to 8 carbon atoms in their structure. The invention furthermore relates to the use of zinc salts for preventing discolorations during the hardening of the building material mixtures.

13 Claims, No Drawings

MIXTURE, IN PARTICULAR CONSTRUCTION MATERIAL MIXTURE CONTAINING FURNACE SLAG

CROSS REFERENCE TO RELATED APPLICATIONS

This application is a national stage application of International Application No. PCT/EP2009/055798, filed 14 May 2009, which claims priority from European Patent Application Serial No. 08 104 186.5, filed 30 May 2008, from which applications priority is claimed, and which are incorporated herein by reference.

The present invention relates to mixtures, preferably building material mixtures, particularly preferably building material binder systems, containing, as a binder, slag sand and zinc salts, the zinc salts having 0 to 8 carbon atoms in their structure. The invention furthermore relates to jointing mortars or coatings containing the mixtures according to the invention and the use of zinc salts in building material mixtures based on slag sand for preventing discolorations.

Inorganic binder systems based on reactive water-insoluble oxides based on silica in combination with alumina, which harden in an aqueous alkaline medium, are generally known. Such binder systems are also referred to as geopolymers and are described in EP 0 026 687, EP 0 153 097 B1 and WO 82/00816.

Metakaolin, slag, fly ash, activated clay or a mixture thereof may be used as a reactive oxide mixture. The alkaline medium for activating the binder usually consists of aqueous solutions of alkali metal carbonates, alkali metal fluorides and in particular alkali metal hydroxide and/or soluble waterglass. The hardened binders have high mechanical and chemical stability. In comparison with cement, they are more economical and more stable and have a more advantageous $CO_2$ emission balance.

Slag sand is a reactive slag from the blast furnace process. Binder systems based on slag sand as the main constituent of the reactive solid component in combination with an aqueous solution of an alkali metal hydroxide and/or waterglass can be used in the building industry for mixing with fillers (quartz sand having an appropriate grade) and additives as mortars or concretes. The use in prefabricated components, coatings and jointing mortars may be mentioned by way of example here.

Such binder systems and mortars are described in DE 3 133 503, EP 1 236 702, EP 1 081 114, JP 2 302 346, JP 4 012 043 and JP 11.079 822.

EP 1 236 702 A1 describes a waterglass-containing building material mixture for the production of mortars which are stable to chemicals and are based on a latent hydraulic binder, waterglass and metal salt as a control agent. Slag sand may also be used as the latent hydraulic constituent. Alkali metal salts are mentioned and used as the metal salt.

EP 0 457 516 A1 describes refractory, water-tight, acid-resistant binders comprising alkali metal silicates, such as microsilica. In these systems, various metal oxides, including zinc oxide, are used as accelerators.

CH 629 246 A5 describes a method for adhesively bonding a metal foil to a mineral fibre board, an adhesive comprising waterglass, clay mineral substances and, inter alia, also oxides of the alkaline earth metals or of zinc being used.

U.S. Pat. No. 6,537,366 B1 describes compositions for colouring concrete which contain at least one derivative of stearic acid, a polymer and a pigment. Zinc stearate is also mentioned as the stearic acid derivative. The stearic acid derivatives serve as water repellents for preventing efflorescence on the surface of cement-bound concretes. The document mentions nothing about the effects of zinc-containing compounds as agents for preventing discolorations in binder systems containing slag sand.

A disadvantage in the case of the known building material mixtures based on alkali-activated slag sand is that discolorations may occur during the hardening of the system. Particularly in regions where the admission of atmospheric oxygen is prevented, dark discolorations are found to a greater extent. It is presumed that these discolorations are caused by sulphur-containing compounds in oxidation state −2. The mortars and concretes produced using this binder system thus do not have an appearance of uniform colour. Particularly with the use of such binder systems in visible coatings and jointing mortars, these discolorations can lead to unacceptable results.

It was therefore an object to provide a mixture, preferably a building material mixture, in particular an alkali-activatable binder which is based on slag sand for building material mixtures and which permits the production of building material mixtures which show no discolorations after application and hardening.

This object could be achieved if the slag sand as a mixture preferably containing a latent hydraulic binder, preferably building material mixture, contains at least one zinc salt which has from 0 to 8 carbon atoms. Zinc salts which have no carbon atoms in their structure are particularly preferred. At least one organic or inorganic zinc salt soluble in an aqueous alkaline medium, particularly preferably an inorganic zinc salt, is preferably present.

The mixtures according to the invention, also referred to below as building material mixture or binder system, have the advantage that discoloration-free mortars and concretes, in particular jointing mortars and coatings for the building industry, can be realised with them in an economical manner.

In addition to slag sand, further known binders can be used as binders in the mixture according to the invention. For example, kaolin, metakaolin, slag, fly ash, microsilica, activated clay, silicas, trass, pozzolana, kieselguhr, diatomaceous earth, gaize, aluminas and/or mixed aluminas/silicas are suitable. These substances are also known by the general terms latent hydraulic binders and pozzolanas. Metakaolin is preferred. Fly ashes and/or microsilica are particularly preferred. One or more of said binders may be used with slag sand.

Slag sand is granulated blast furnace slag. Finely milled granulated slag sand is also referred to as ground granulated blast furnace slag. Such products are generally known to the person skilled in the art as binders. Depending on its origin and its prepared form, ground granulated blast furnace slag varies in its milling fineness and particle size distribution, the milling fineness influencing the reactivity of the ground granulated blast furnace slag. The Blaine value is used as a characteristic for the milling fineness. Slag sand or ground granulated blast furnace slag can generally be used in known form for building material mixtures setting by alkaline activation. Slag sand which has a Blaine value greater than 2000 $cm^2/g$, particularly preferably greater than 3000 $cm^2/g$, is preferred. Slag sand which has a Blaine value between 2000 and 10000 $cm^2/g$, particularly preferably between 3000 and 5000 $cm^2/g$, is particularly suitable.

According to the present invention, slag sand which contains between 30 and 45% by weight of CaO, between 30 and 45% by weight of $SiO_2$, between 5 and 15% by weight of $Al_2O_3$ and between 4 and 17% by weight of MgO is particularly preferred.

In a particularly preferred embodiment, the slag sand can be used in an amount between 10 and 95% by weight, preferably between 20 and 60% by weight, based in each case on the total weight of the binder present in the mixture. The slag sand can preferably be used together with metakaolin, particularly preferably with fly ashes and/or microsilica. Cement can also preferably be used as a further binder in this mixture. A proportion by weight of 20 to 70% by weight, particularly preferably 30 to 60% by weight, of cement, based on the total weight of the mixture, is preferred. The strongly alkaline cement also acts as an activating component for hardening the building material mixtures.

Thus, particularly preferred mixtures are those which contain as binders:
between 5 and 90% by weight,
preferably between 10 and 50% by weight,
particularly preferably between 10 and 40% by weight, of slag sand,
between 1 and 70% by weight, preferably between 5 and 65, particularly preferably between 10 and 50% by weight, of fly ash and/or microsilica. In addition, the mixture may preferably contain aqueous activator solutions or particularly preferably pulverulent activators in an amount between 10 and 90% by weight, preferably between 10 and 70% by weight, particularly preferably between 15 and 50% by weight.

The weight data are based in each case on the total weight of the mixture.

Thus, particularly preferred mixtures are those which contain as binders:
between 5 and 90% by weight,
preferably between 5 and 50% by weight,
particularly preferably between 5 and 40% by weight, of slag sand,
between 5 and 90% by weight, preferably between 10 and 60% by weight, particularly preferably between 15 and 50% by weight, of metakaolin. In addition, the mixture may preferably contain aqueous activator solutions or particularly preferably pulverulent activators in an amount between 10 and 90% by weight, preferably between 10 and 70% by weight, particularly preferably between 15 and 65% by weight.

The weight data are based in each case on the total weight of the mixture.

Provided that the zinc salt has from 0 to 8 carbon atoms in its structure, generally known compounds, for example organic (for example zinc salts of organic carboxylic acids) or inorganic zinc salts, preferably based on $Zn^{2+}$, particularly preferably inorganic zinc salts, in particular inorganic zinc salts which are soluble in an aqueous alkaline medium, can be used as a zinc salt according to the invention in the mixtures. Zinc oxide, zinc fluoride and/or zinc sulphate are preferably used as the zinc salt. It is also possible to use zinc chloride but, owing to its chloride content, it is less desirable in relatively large amounts. Zinc oxide which is readily soluble in an aqueous alkaline solution is particularly preferably used. 0.001 to 10% by weight, particularly preferably 0.1 to 7% by weight and especially preferably 0.5 to 5% by weight of zinc salt are preferably present in the mixtures. Zinc salts having more than eight carbon atoms per structural unit, such as, for example, zinc stearate, have the disadvantage, that, presumably because of their hydrophobic structure, the strengths of the building material mixtures are adversely affected. Moreover, the hardened building material is more porous and therefore less stable. It is in principle possible to use said zinc salts alone or mixtures of different zinc salts.

The zinc salts according to the invention can preferably be mixed in powder form into the mixture containing ground granulated blast furnace slag. The zinc salt is preferably mixed into the pulverulent binder mixture containing slag sand.

It is also possible to use the zinc salts as a solution in an activator described below. Before the mixing of the binder with the aqueous activator solution, the zinc salt can preferably be dissolved in the aqueous activator solution.

The zinc salt is preferably a milled salt which preferably has particle sizes with a $d_{90}$ value of less than 90 µm. The rate of dissolution of the zinc salt increases with increasing milling fineness.

In a preferred embodiment, the mixtures according to the invention contain slag sand and, in addition to the slag sand, the zinc salt according to the invention.

In a further preferred embodiment, the mixtures according to the invention also contain an activator in addition to optional further binders. The activator is preferably pulverulent. In this case, the term used is a one-component system, which can then be caused to harden by the addition of water. The activator serves for accelerating the setting process of the binder. Known compounds can generally be used as activators for this purpose, in particular for activating slag sands. Usually, the activators are alkaline compounds in powder form or solutions.

The activator can also be used in the form of a solution. In this case, the activator solution is usually mixed with a mixture of ground granulated blast furnace slag and optionally further binders, whereupon hardening begins. The mixtures preferably contain, as an activator, at least one alkali metal compound, e.g. alkali metal silicates, carbonates of alkali or alkaline earth metals, such as, for example, magnesium carbonate, calcium carbonate, potassium carbonate, sodium carbonate, lithium carbonate, cement, alkali metal salts of organic and inorganic acids; sodium, potassium and lithium hydroxide and/or calcium and magnesium hydroxide are particularly preferred. The use of waterglass, preferably liquid waterglass, in particular alkaline potassium or sodium waterglass, is furthermore preferred.

This may be Na, K or lithium waterglass. The modulus (molar ratio of $SiO_2$ to alkali metal oxide) of the waterglass is preferably less than 4, preferably less than 2. In the case of waterglass powder, the modulus is less than 5, preferably between 1 and 4, particularly preferably between 1 and 3.

In a further preferred embodiment, the mixtures contain, as activators, at least one alkali metal or alkaline earth metal hydroxide, silicate, aluminate, carbonate and/or sulphate and/or an alkali metal or alkaline earth metal salt of an inorganic or organic acid, in particular sodium, potassium and lithium silicates and/or sodium, potassium and lithium hydroxide which are water-soluble or dissolved in water.

As already described, the activator can preferably be used in aqueous solution. The concentration of the activator in the solution can be tailored to the generally customary practice. The alkaline activating solution preferably comprises, sodium, potassium or lithium hydroxide solutions and/or sodium, potassium or lithium silicate solutions having a concentration of 1 to 70% by weight of solid, preferably 30 to 50% by weight of solid. The amount used in the binder system is preferably 5 to 80% by weight, particularly preferably 20 to 60% by weight, especially preferably 30 to 50% by weight. Mixtures which contain the following components are particularly preferred:
between 0.001 and 10% by weight, particularly preferably between 0.1 and 3% by weight, of the zinc salt according to the invention,
between 5 and 50% by weight, particularly preferably between 10 and 40% by weight, of slag sand, between 5 and 50% by weight, particularly preferably between 5 and 40% by weight, especially preferably between 10 and 30% by weight, of activator, preferably an alkaline activating solution.

The weight data are based in each case on the total weight of the mixture.

If appropriate, between 0 and 80% by weight, particularly preferably between 30 and 70% by weight, of fillers and, if appropriate, between 0 and 15% by weight of additives, preferably additives differing from the abovementioned components, may be present in the mixtures.

The weight data are based in each case on the total weight of the mixture.

The binder system according to the invention is preferably used for the production of mortars and concretes. For the production of such mortars and concretes, the binder system described above is usually mixed with further components, such as fillers, latent hydraulic substances and further additives. The addition of the pulverulent activator is preferably effected before said components are mixed with water, so that a so-called ready-mix mortar is produced. Thus, the activating component is present in pulverulent form, preferably as a mixture with the binders and/or sand. Alternatively, an aqueous, preferably alkaline activating solution can be added to the other pulverulent components. In this case, the term two-component binder is used.

Generally known gravels, sands and/or flours, for example based on quartz, limestone, barite or clays, are suitable as a filler. Light fillers, such as perlites, kieselguhr (diatomaceous earth), expanded mica (vermiculite) and foamed sand, can also be used. The proportion of the fillers in the mortar or concrete can usually be between 0 and 80% by weight, based on the total weight of the mortar or concrete and depending on the application.

Suitable additives are generally known plasticizers, antifoams, water retention agents, pigments, fibres, dispersion powders, wetting agents, retardants, accelerators, complexing agents, aqueous dispersions and rheology modifiers.

The invention furthermore relates to the use of zinc salts in building material mixtures based on slag sand for preventing discolorations. Zinc salts which have from 0 to 8 carbon atoms in their structure are preferably used.

The present invention furthermore relates to jointing mortars or coatings which contain the mixtures according to the invention.

EXAMPLES

Preparation of the Binder Adhesive

First, all pulverulent constituents are premixed and then stirred with water or, as in the case of M1, M2, M1v, M2v, with the liquid activating component on the basis of DIN EN 196 to give a homogeneous binder adhesive.

Production of the Test Specimens

Test specimen prisms having the dimensions 4×4×16 cm are produced from the stirred binder adhesive according to DIN EN 196 and stored on the basis of said standard. A visual check for discolorations is then effected.

The example formulations are summarised in the table below.

| Starting materials | | M1 | M1v | M2 | M2v | M3 | M3v |
|---|---|---|---|---|---|---|---|
| | | Data in parts by mass | | | | | |
| Pulverulent | Ground granulated blast furnace slag | 20 | 20 | 13.6 | 13.6 | 29.2 | 29.2 |
| | Microsilica | 20 | 20 | — | — | 29.2 | 29.2 |
| | Fly ash | 19.4 | 19.4 | — | — | — | — |
| | Metakaolin | — | — | 31.8 | 31.8 | — | — |
| | Zinc oxide powder (from FLUKA) | 0.6 | — | 0.4 | — | 0.7 | — |
| | Sodium metasilicate | — | — | — | — | 11.7 | 11.7 |
| Liquid | Potassium waterglass solution (Modulus 1.5: 50% solid) | 40 | 40.6 | 54.2 | 54.6 | — | — |
| | Demineralized water | — | — | — | — | 29.2 | 29.9 |

The mixtures M1 and M2 according to the invention are two-component mixtures; M3 is a one-component binder which is mixed with water as stated. The building material mixtures characterized by v (M1v to M3v) contain no zinc salts and have to be regarded as comparative examples.

After only 24 hours, the visual check clearly shows that the samples M1 (cement grey), M2 (beige to sand-colour) and M3 (light grey) containing a zinc salt do not have dark discolorations. The building materials appear to have a uniform colour.

On the other hand, the samples of the mixtures M1v, M2v and M3v which are free of zinc salt have a substantially darker to green-black discoloration. This discoloration occurs after stirring of the mixtures and increases. The dark discolorations also persist after storage under standard conditions for 28 days. In general, the discolorations are inhomogeneous, which particularly adversely affects the visual impression.

The invention claimed is:

1. A building material binder system containing between 5 and 50% by weight slag sand as a first binder, and between 1 and 70% by weight microsilica and/or between 5 and 90% by weight metakaolin as a second binder, wherein the binder system contains between 0.001 and 10% by weight of a zinc salt, the zinc salt having from 0 to 8 carbon atoms, and between 5 and 50% by weight of an activator comprising at least one alkali metal compound, wherein the percentages are based on the total weight of the binder system.

2. The building material binder system according to claim 1, wherein the binder system contains fly ash as a further binder.

3. The building material binder system according to claim 1, wherein the slag sand has a specific surface area (Blaine value) of greater than 2000 $cm^2/g$.

4. The building material binder system according to claim 1, wherein the binder system contains the slag sand, the microsilica and/or metakaolin, and optionally fly ash as a first component, and the activator as a second component.

5. The building material binder system according to claim 1, wherein the binder system contains the activator in pulverulent form.

6. The building material binder system according to claim 1, wherein the activator comprises at least one of alkali metal hydroxide, alkali metal silicate, alkali metal aluminate, alkali metal carbonate, or alkali metal sulphate.

7. The building material binder system according to claim 1, wherein the binder system contains zinc oxide, zinc fluoride and/or zinc sulphate as the zinc salt.

8. The building material binder system according to claim 6, wherein the activator comprises alkaline potassium waterglass.

9. The building material binder system according to claim 1, wherein the microsilica is present in an amount of between 10 and 50% by weight based on the total weight of the binder system.

10. The building material binder system according to claim 1, wherein the metakaolin is present in an amount of between 15 and 50% by weight based on the total weight of the binder system.

11. The building material binder system according to claim 1, wherein the zinc salt is present in an amount of from 0.1 to 7% by weight based on the total weight of the binder system.

12. Jointing mortars or coatings containing the building material binder system according to claim 1.

13. A method comprising introducing in a building material binder system based on slag sand: (i) between 0.001 and 10% by weight of a zinc salt for preventing discolorations; (ii) between 1 and 70% by weight microsilica and/or between 5 and 90% by weight metakaolin as a second binder; and (iii) between 5 and 50% by weight of an activator comprising at least one alkali metal compound; wherein the building material binder system comprises between 5 and 50% by weight slag sand and wherein the percentages by weight are based on the total weight of the binder system.

\* \* \* \* \*